(12) United States Patent
Kim et al.

(10) Patent No.: US 8,106,552 B2
(45) Date of Patent: Jan. 31, 2012

(54) VIBRATION MOTOR

(75) Inventors: Sang Won Kim, Gyunggi-do (KR); Yong Tae Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 180 days.

(21) Appl. No.: 12/538,793

(22) Filed: Aug. 10, 2009

(65) Prior Publication Data

US 2010/0259114 A1  Oct. 14, 2010

(30) Foreign Application Priority Data

Apr. 14, 2009  (KR) .................. 10-2009-0032123

(51) Int. Cl.
 *H02K 7/06* (2006.01)
(52) U.S. Cl. ........................................... 310/81
(58) Field of Classification Search .............. 310/81, 310/49.55, 268
 See application file for complete search history.

(56) References Cited

U.S. PATENT DOCUMENTS

| | | | | |
|---|---|---|---|---|
| 3,818,690 A * | 6/1974 | Schwarzschild | ............. | 368/155 |
| 4,367,049 A * | 1/1983 | Laesser et al. | .................. | 368/76 |
| 4,484,095 A * | 11/1984 | Neumann | ....................... | 310/82 |
| 5,126,605 A * | 6/1992 | Palmero | .......................... | 310/36 |
| 6,573,627 B2 * | 6/2003 | Sun | ................. | 310/81 |
| 6,600,245 B1 * | 7/2003 | Yang et al. | ..................... | 310/71 |
| 6,836,039 B2 * | 12/2004 | Choi et al. | ..................... | 310/81 |
| 7,157,823 B2 * | 1/2007 | Noguchi | ......................... | 310/81 |
| 2011/0148226 A1 * | 6/2011 | Horng et al. | .............. | 310/49.55 |

\* cited by examiner

*Primary Examiner* — Dang D Le

(74) *Attorney, Agent, or Firm* — Blakely Sokoloff Taylor & Zafman LLP

(57) ABSTRACT

Disclosed herein is vibration motor. The vibration motor includes a bearing rotatably fitted over a support shaft which is installed to be perpendicular to a base. A hub is coupled to the bearing, with an eccentric member provided on the edge of the hub. A coil is mounted to the hub to form an electric field. A magnet having 2n poles is mounted on the base, and rotates the hub using electromagnetic force between the magnet and the coil. A detent magnet is mounted to the hub and stops the coil in the middle between the poles of the magnet.

19 Claims, 9 Drawing Sheets

VIBRATION MOTOR

CROSS REFERENCE TO RELATED APPLICATION(S)

This application claims the benefit of Korean Patent Application No. 10-2009-0032123, filed on Apr. 14, 2009, entitled "VIBRATION MOTOR", which is hereby incorporated by reference in its entirety into this application.

BACKGROUND OF THE INVENTION

1. Technical Field

The present invention relates, in general, to vibration motors and, more particularly, to a vibration motor which has a detent magnet to stop a coil in the middle between the poles of a magnet, thus allowing the coil to be always placed at a location at which maximum starting torque is generated, therefore maximally securing starting torque and perfectly eliminating a dead point.

2. Description of the Related Art

Recently, as the use of personal information and communication devices such as mobile terminals or mobile phones has been increasing, most of the devices have used a vibration motor which transmits a receiving signal to a user in a silent manner so that other people are not inconvenienced. Vibration motors used in most electronic devices have been competitively produced by many manufacturing companies so as to realize superior performance and good quality in comparison with their cost.

Currently, a two-phase vibration motor is being produced to achieve good performance and reliable quality. Meanwhile, a single-phase vibration motor inevitably has the defect of having a dead point at which starting is impossible. However, the single-phase motor provides many advantages to motor producers and users, because the single-phase motor reduces the number of parts and the number of processes, thus reducing cost and enhancing quality. Therefore, research has been made into a flat single-phase motor which eliminates the dead point and uses a magnet with detent force.

FIG. 9 illustrates the arrangement of devices for generating the detent force of a conventional vibration motor so as to precisely limit the stop position of a rotor, this being the conventional method of eliminating the dead point. As shown in FIG. 9, the method of designating a starting position at a point slightly deviating from a maximum torque area cannot stop a coil between the N and S poles at which maximum starting torque may be generated.

Accordingly, there is an urgent need for the development of a flat single-phase motor which can eliminate the dead point and generate maximum torque without deteriorating performance.

SUMMARY OF THE INVENTION

The present invention has been made in an effort to provide a vibration motor which has a detent magnet to stop a coil in the middle between the poles of a magnet, thus allowing the coil to be always placed at a location at which maximum starting torque is generated, therefore maximally securing starting torque and perfectly eliminating a dead point.

A vibration motor according to an embodiment of the present invention includes a bearing rotatably fitted over a support shaft which is installed to be perpendicular to a base. A hub is coupled to the bearing, with an eccentric member provided on the edge of the hub. A coil is mounted to the hub to form an electric field. A magnet having 2n poles is mounted on the base and rotates the hub using electromagnetic force between the magnet and the coil. A detent magnet is mounted to the hub and stops the coil in the middle between the poles of the magnet.

The hub may further include a PCB which is provided on the lower portion of the hub and has a commutator alternating current of a rotor, and a brush which is mounted to the base.

The magnet may have the shape of a ring having 2n poles, and may include an outer circumference and an inner circumference.

The detent magnet may be provided such that the number thereof corresponds to the number of polarities of the magnet.

The coil may be placed in the middle between the poles of the magnet because of detent force of the detent magnet when the motor is not driven.

Further, a vibration motor according to another embodiment of the present invention includes a bearing rotatably fitted over a support shaft which is installed to be perpendicular to a base. A hub is coupled to the bearing, with an eccentric member provided on the edge of the hub. A coil is mounted to the base to form an electric field. A magnet having 2n poles is mounted to the hub and rotates the hub using electromagnetic force between the magnet and the coil. A detent magnet is mounted on the base and stops the coil in the middle between the poles of the magnet.

The magnet may have a shape of a ring having 2n poles, and may include an outer circumference and an inner circumference.

The detent magnet may be provided such that the number thereof corresponds to the number of polarities of the magnet.

The base may further include on an upper portion thereof a drive IC for controlling a direction of power applied to the coil, in response to a signal detected by a Hall sensor which detects a position of the hub.

The coil may be placed in the middle between the poles of the magnet because of detent force of the detent magnet.

The detent magnet may be placed to face the magnet.

The detent magnet may be placed to be adjacent to the inner circumference of the magnet.

The detent magnet may be adjacent to the inner circumference of the magnet, and may be placed at a position corresponding to ⅓ of a width of the magnet.

The detent magnet may be placed to be adjacent to the outer circumference of the magnet.

The detent magnet may be adjacent to the outer circumference of the magnet, and may be placed at a position corresponding to ⅓ of a width of the magnet.

The detent magnet may be placed at the center of the magnet.

The detent magnet may be placed such that the detent magnet does not face the magnet.

The detent magnet may be placed adjacent to the axial center of the inner circumference of the magnet.

The detent magnet may be placed outside the outer circumference of the magnet.

DESCRIPTION OF THE PREFERRED EMBODIMENTS

Hereinafter, vibration motors according to the preferred embodiments of the present invention will be described in detail with reference to the accompanying drawings.

Figure 1:
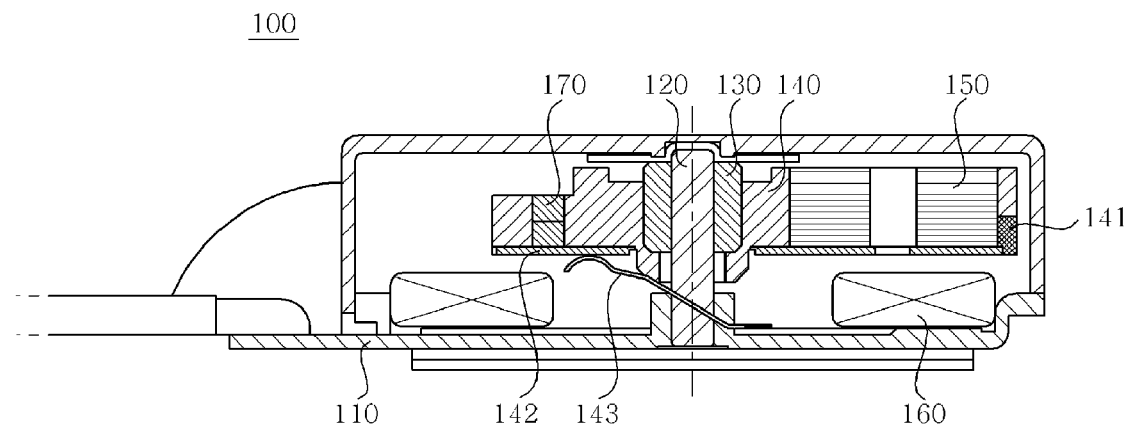
FIG. 1 is a view illustrating a vibration motor according to an embodiment of the present invention.

As shown in FIG. 1, a vibration motor 100 according to the first embodiment of the present invention includes a bearing 130 which is rotatably fitted over a support shaft 120 which is installed to be perpendicular to a base 110. A hub 140 is coupled to the bearing 130, with an eccentric member 141 provided on the edge of the hub 140. A coil 150 is mounted to the hub 140 to form an electric field. A magnet 160 having 2n poles is mounted on the base 110 and functions to rotate the hub 140 using electromagnetic force between the magnet 160 and the coil 150. A detent magnet 170 is mounted to the hub 140 and generates detent force to stop the coil 150 in the middle between the poles of the magnet 160.

Further, the vibration motor 100 according to the first embodiment of the present invention also includes a PCB 142 and a brush 143. The PCB 142 is provided on the lower portion of the hub 140 and provided with a commutator which alternates the current of a rotor. The brush 143 is provided on the base 110.

The hub 140 is cast using plastics, with the coil 150, the detent magnet 170, and the eccentric member 141 mounted on the PCB 142. A hole is formed in the PCB 142 under the central portion of the coil 150, thus contributing to the smooth generation of electromagnetic force between the coil 150 and the magnet 160. The eccentric member 141 uses a heavy material such as iron.

Figure 2:
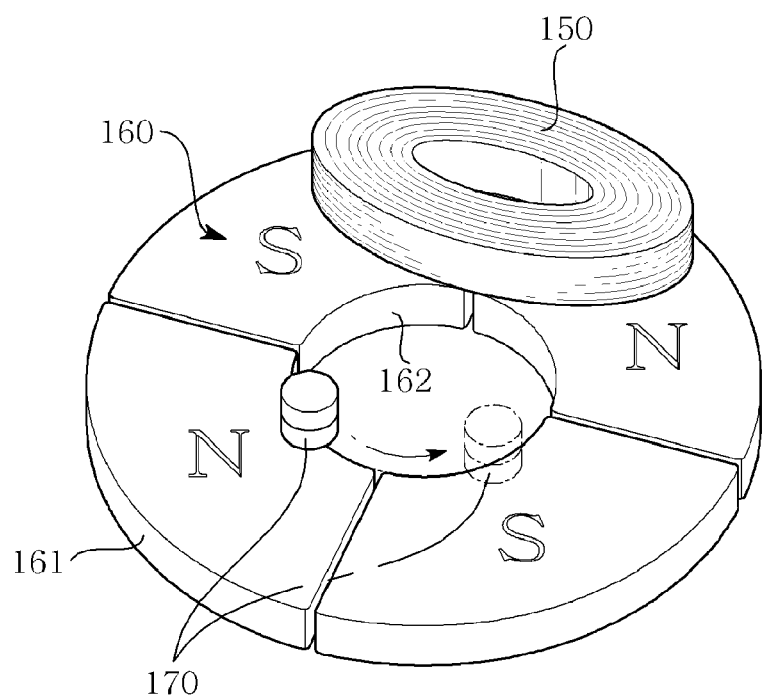
FIG. 2 is a detailed view illustrating a magnet of the vibration motor according to the present invention.
Figure 3:
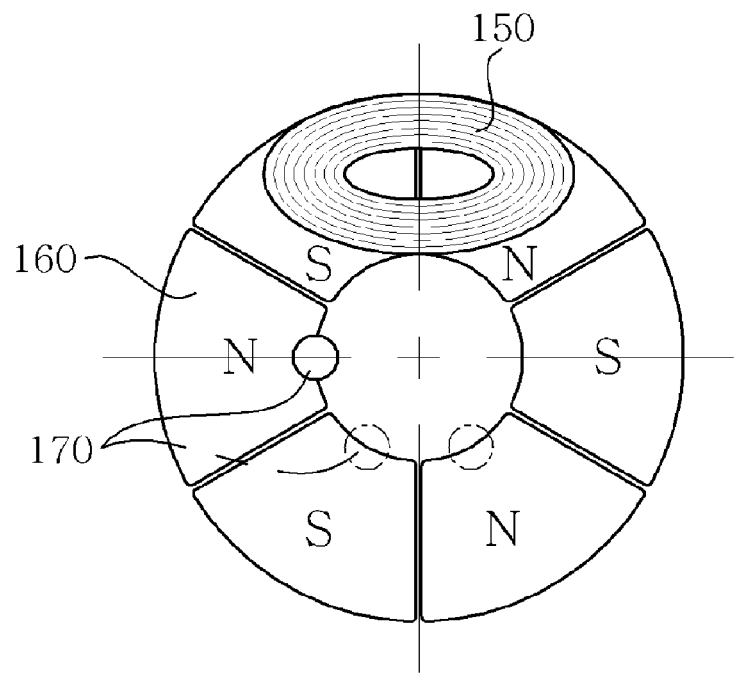
FIGS. 3 and 4 are detailed views illustrating other embodiments of magnets applied to the vibration motor of FIG. 1.
Figure 4:
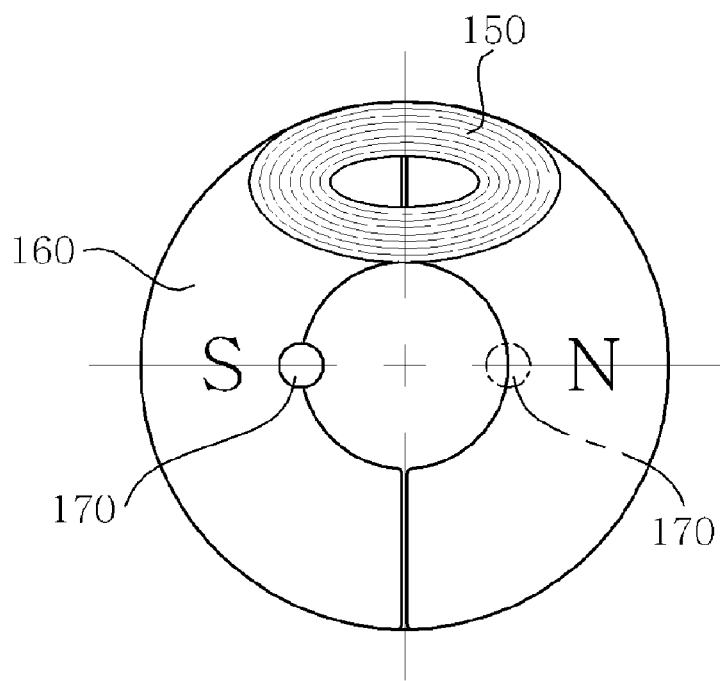

As shown in FIGS. 2 to 4, the magnet 160 of the vibration motor 100 according to the first embodiment of the present invention has the shape of a ring having 2n poles, and is provided with an outer circumference 161 and an inner circumference 162.

The detent magnet 170 is provided such that its number corresponds to the number of polarities of the magnet 160, and the coil 150 is positioned in the middle between the poles of the magnet 160 because of the detent force of the detent magnet 170.

Figure 5:
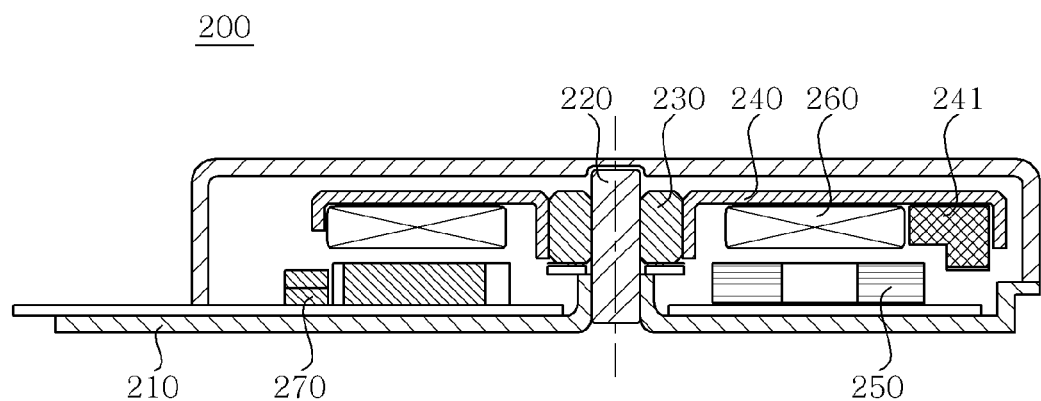
FIG. 5 is a view illustrating a vibration motor according to another embodiment of the present invention.
Figure 6A:
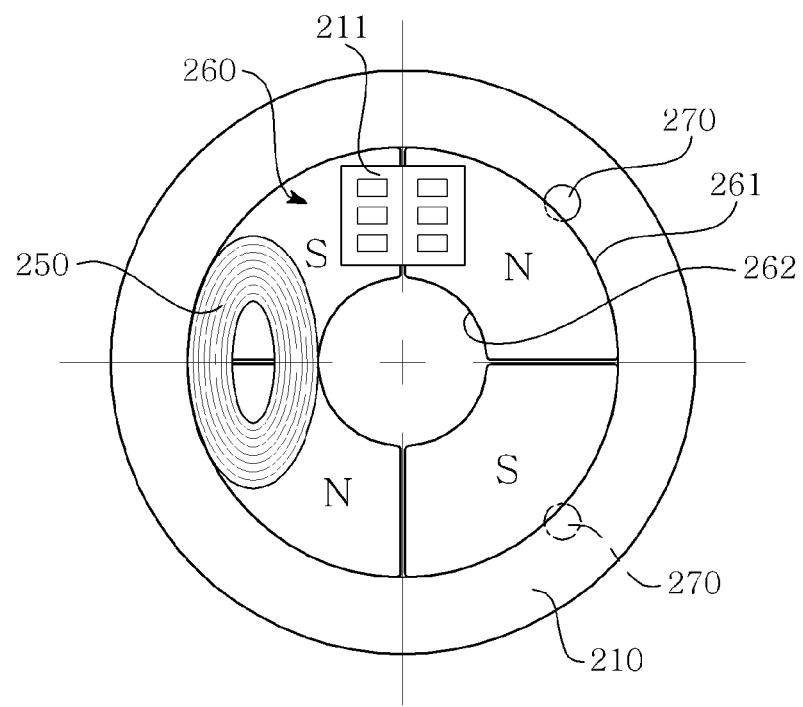
FIGS. 6A-E and 7 are detailed views illustrating other embodiments of magnets applied to the vibration motor of FIG. 5.
Figure 6B:
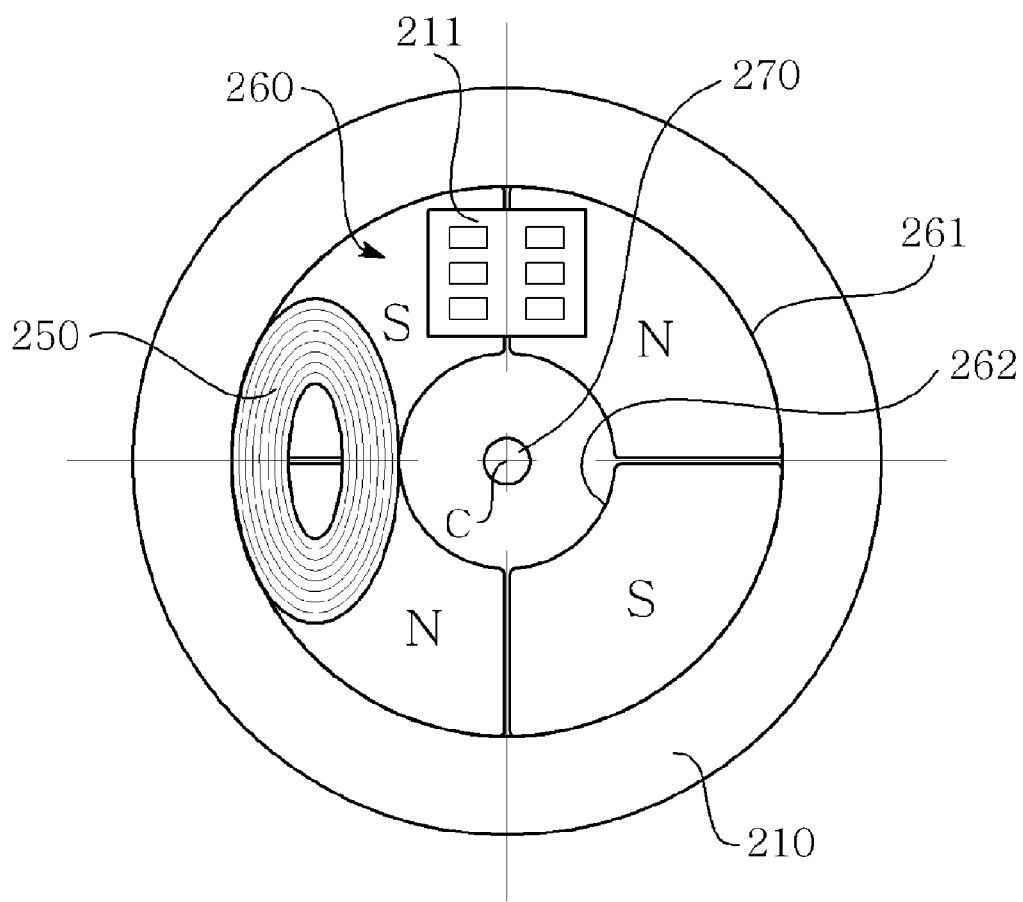
Figure 6C:
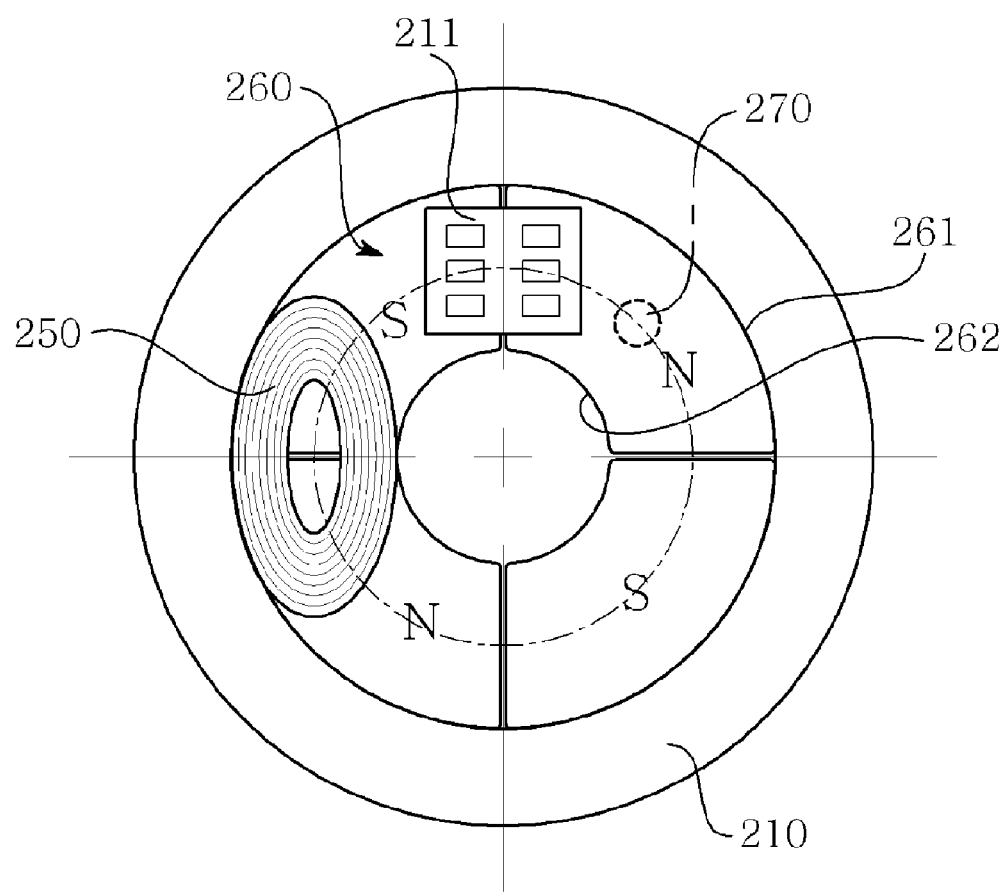
Figure 6D:
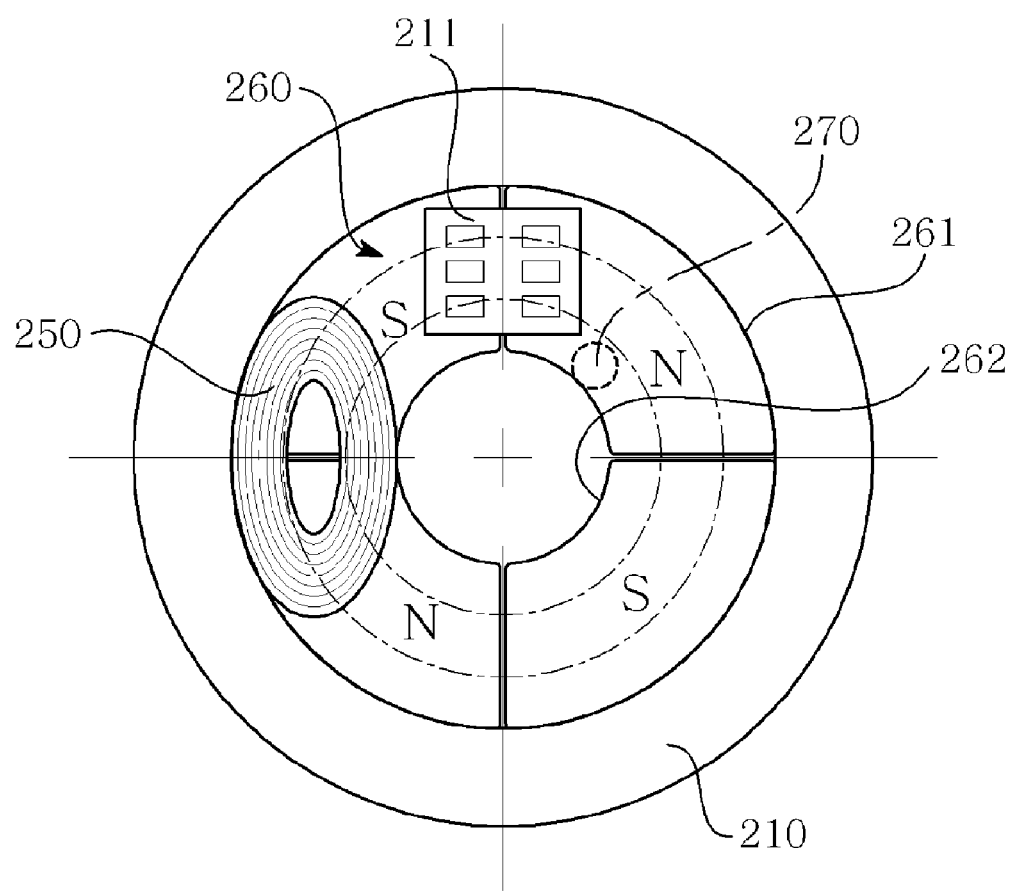
Figure 6E:
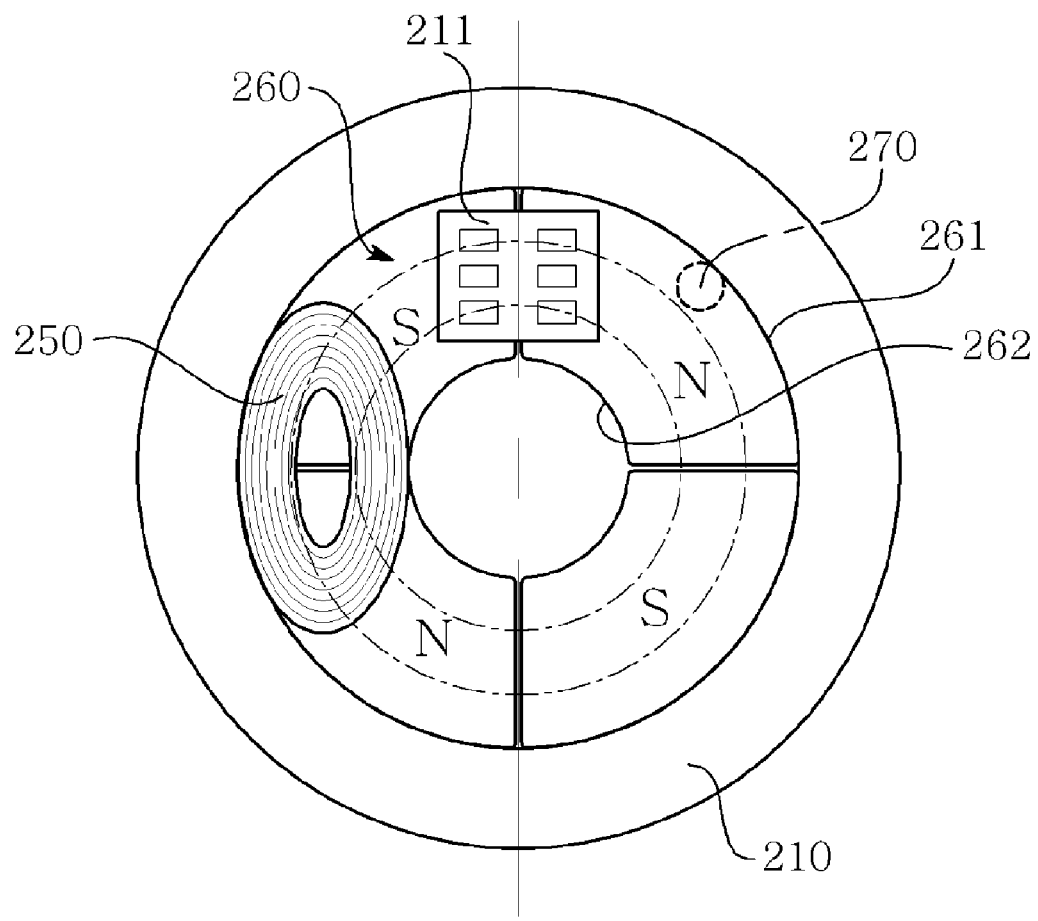

FIG. 5 illustrates a BLDC (Brushless DC) vibration motor 200 according to the second embodiment of the present invention. The BLDC vibration motor 200 includes a bearing 230 which is rotatably fitted over a support shaft 220 which is installed to be perpendicular to a base 210. A hub 240 is coupled to the bearing 230, with an eccentric member 241 provided on the edge of the hub 240. A coil 250 is mounted to the base 210 to form an electric field. A magnet 260 having 2n poles is mounted to the hub 240 and functions to rotate the hub 240 using electromagnetic force between the magnet 260 and the coil 250. A detent magnet 270 is mounted on the base 210 and generates detent force to stop the coil 250 in the middle between the poles of the magnet 260.

Figure 7:
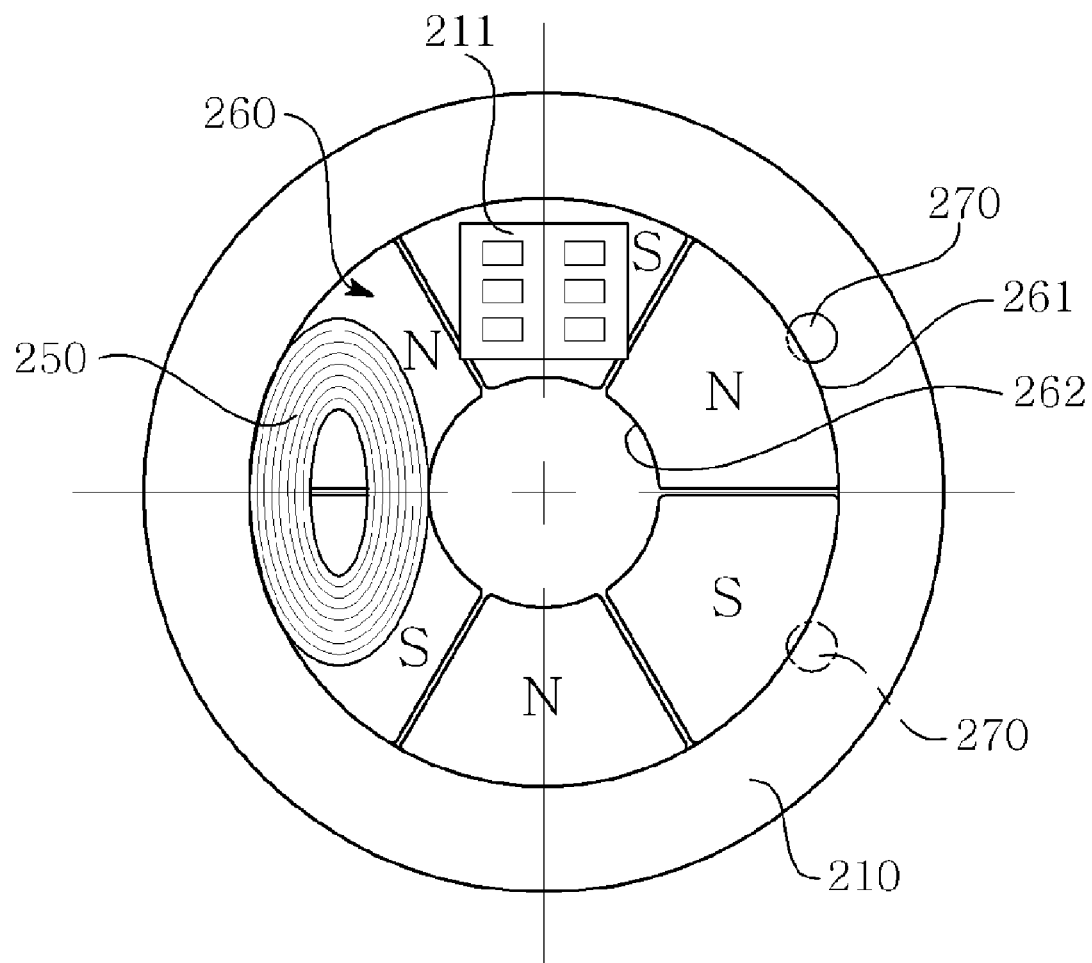
Figure 8:
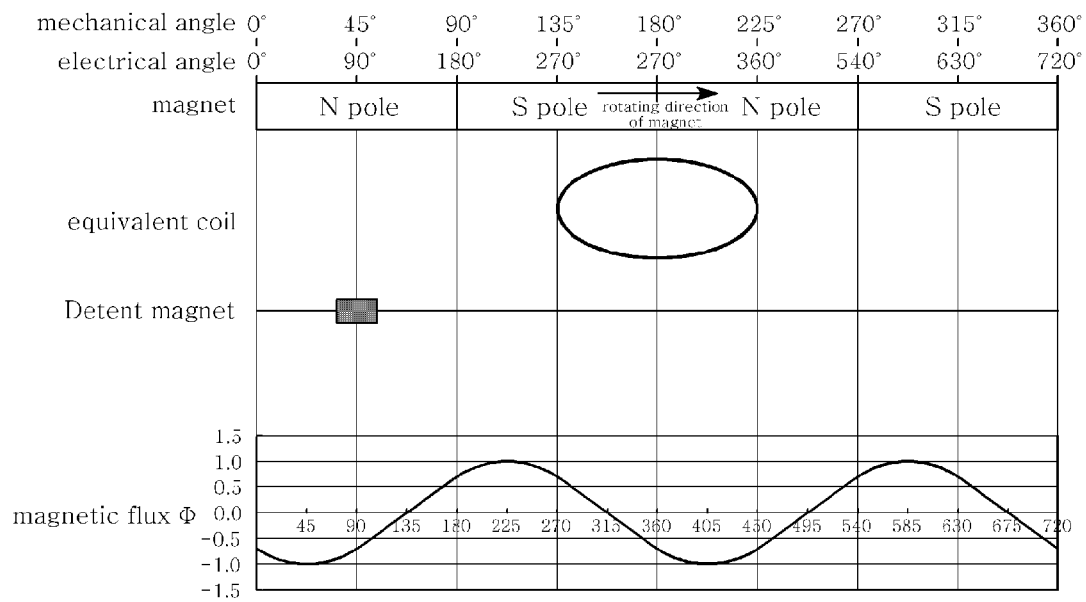
FIG. 8 is a graph illustrating the arrangement of magnets in the vibration motor according to the present invention.
Figure 9:
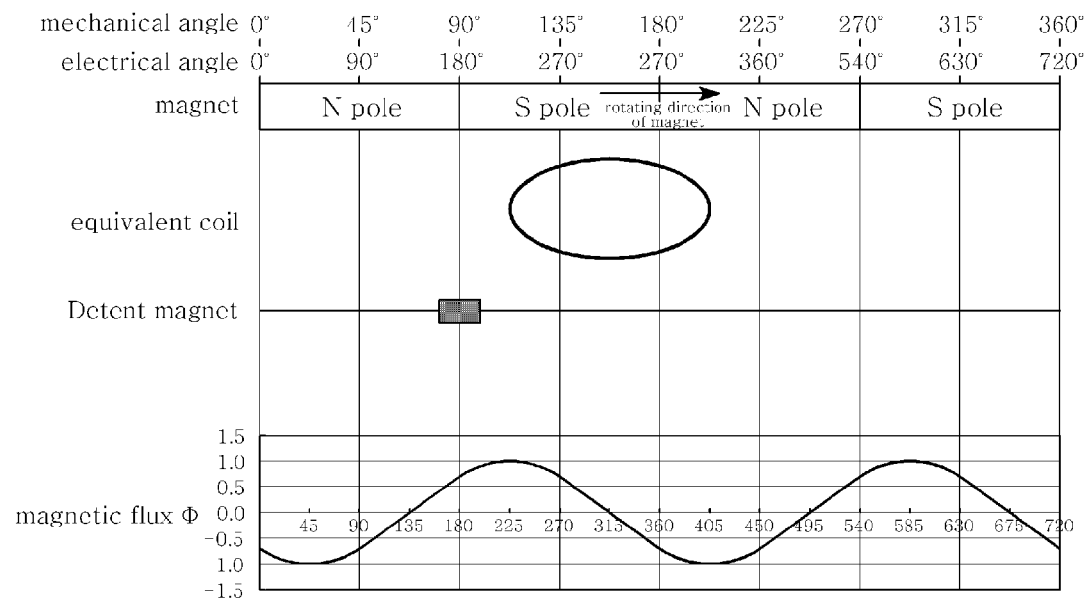
FIG. 9 is a graph illustrating the arrangement of magnets in a conventional vibration motor.

As shown in FIGS. 6 to 8, the magnet 260 of the vibration motor 200 according to the second embodiment of the present invention has the shape of a ring having 2n poles, and is provided with an outer circumference 261 and an inner circumference 262.

The detent magnet 270 is provided such that its number corresponds to the number of polarities of the magnet 260.

The base 210 further has on its upper portion a drive IC 211 which controls the direction of power applied to the coil 250, in response to a signal which is detected by a Hall sensor which detects the position of the hub 240. The drive IC 211 in which the Hall sensor is embedded serves as a brush of a brush vibration motor.

The coil 250 is positioned in the middle between the poles of the magnet 260 because of the detent force of the detent magnet 270.

The detent magnet 170 or 270 of the vibration motor 100 or 200 according to the present invention is placed to face the magnet 160 or 260, or is placed at a center of the magnet 160 or 260, or is placed in such a way that the detent magnet 170 or 270 does not face the magnet 160 or 260.

In the case where the detent magnet 170 or 270 is placed to face the magnet 160 or 260, the detent magnet 170 or 270 is placed to be adjacent to the inner circumference 162 or 262 or the outer circumference 161 or 261 of the magnet 160 or 260.

When the detent magnet 170 or 270 is placed to be adjacent to the inner circumference 162 or 262 of the magnet 160 or 260, the detent magnet 170 or 270 is placed around a location corresponding to ⅓ of the width of the magnet 160 or 260.

Meanwhile, when the detent magnet 170 or 270 is placed to be adjacent to the outer circumference 161 or 261 of the magnet 160 or 260, the detent magnet 170 or 270 is placed around a location corresponding to ⅓ of the width of the magnet 160 or 260.

Further, when the detent magnet 170 or 270 is placed in such a way that it does not face the magnet 160 or 260, the detent magnet 170 or 270 is placed near the axial center of the inner circumference 162 or 262 of the magnet 160 or 260, or placed outside the outer circumference 161 or 261 of the magnet 160 or 260.

FIG. 8 is a view illustrating the arrangement of the detent magnet 170 or 270 and the coil 150 or 250 of the vibration motor 100 or 200 according to the present invention. As shown in FIG. 8, if the detent magnet 170 or 270 has the polarities of 2n, the coil 150 or 250 always stops in the middle between the poles.

Thus, the coil 150 or 250 can always stop at an accurate position and with a smaller error in comparison with a magnetic segment or protrusion. Hence, the vibration motor 100 or 200 of the present invention allows the coil 150 or 250 to be always placed at a location where maximum starting torque is generated, thus being capable of maximally obtaining starting torque and perfectly eliminating the dead point.

As described above, the present invention provides a vibration motor which has a detent magnet to stop a coil in the middle between the poles of a magnet, thus allowing the coil to be always placed at a location at which maximum starting torque is generated, therefore maximally securing starting torque and perfectly eliminating a dead point.

What is claimed is:

1. A vibration motor, comprising:
a bearing rotatably fitted over a support shaft which is installed to be perpendicular to a base;
a hub coupled to the bearing, with an eccentric member provided on an edge of the hub;
a coil mounted to the hub to form an electric field;
a magnet having 2n poles, mounted on the base, and rotating the hub using electromagnetic force between the magnet and the coil; and
a detent magnet mounted to the hub and stopping the coil in the middle between the poles of the magnet, wherein, the lower surface of the coil and the upper surface of the magnet are facing each other, and, the detent magnet is placed above the magnet.

2. The vibration motor as set forth in claim 1, wherein the hub further comprises:
   a PCB provided on a lower portion of the hub, and having a commutator which alternates current of a rotor; and
   a brush mounted to the base.

3. The vibration motor as set forth in claim 1, wherein the magnet has a shape of a ring having 2n poles, and includes an outer circumference and an inner circumference.

4. The vibration motor as set forth in claim 1, wherein the detent magnet is provided such that the number thereof corresponds to the number of polarities of the magnet.

5. The vibration motor as set forth in claim 1, wherein the coil is placed in the middle between the poles of the magnet because of detent force of the detent magnet when the motor is not driven.

6. The vibration motor as set forth in claim 1, wherein the detent magnet is placed to face or does not face the magnet.

7. A vibration motor, comprising:
   a bearing rotatably fitted over a support shaft which is installed to be perpendicular to a base;
   a hub coupled to the bearing, with an eccentric member provided on an edge of the hub;
   a coil mounted to the base to form an electric field;
   a magnet mounted to the hub, rotating the hub using electromagnetic force between the magnet and the coil, and having 2n poles; and
   a detent magnet mounted on the base and stopping the coil in the middle between the poles of the magnet, wherein, the lower surface of the coil and the upper surface of the magnet are facing each other, and, the detent magnet is placed above the magnet.

8. The vibration motor as set forth in claim 7, wherein the magnet has a shape of a ring having 2n poles, and includes an outer circumference and an inner circumference.

9. The vibration motor as set forth in claim 7, wherein the detent magnet is provided such that the number thereof corresponds to the number of polarities of the magnet.

10. The vibration motor as set forth in claim 7, wherein the base further comprises on an upper portion thereof a drive IC for controlling a direction of power applied to the coil, in response to a signal detected by a Hall sensor which detects a position of the hub.

11. The vibration motor as set forth in claim 7, wherein the coil is placed in the middle between the poles of the magnet because of detent force of the detent magnet.

12. The vibration motor as set forth in claim 7, wherein the detent magnet is placed to face or does not face the magnet.

13. The vibration motor as set forth in claim 12, wherein the detent magnet is placed to be adjacent to the inner circumference of the magnet.

14. The vibration motor as set forth in claim 13, wherein the detent magnet is adjacent to the inner circumference of the magnet, and is placed at a position corresponding to ⅓ of a width of the magnet.

15. The vibration motor as set forth in claim 12, wherein the detent magnet is placed to be adjacent to the outer circumference of the magnet.

16. The vibration motor as set forth in claim 15, wherein the detent magnet is adjacent to the outer circumference of the magnet, and is placed at a position corresponding to ⅓ of a width of the magnet.

17. The vibration motor as set forth in claim 12, wherein the detent magnet is placed at a center located between inner and outer circumferences of the magnet.

18. The vibration motor as set forth in claim 7, wherein the detent magnet is placed adjacent to an axial center of the inner circumference of the magnet.

19. The vibration motor as set forth in claim 7, wherein the detent magnet is placed outside the outer circumference of the magnet.

* * * * *